C. BAETZ.
STANCHION FOR ANIMALS.
APPLICATION FILED AUG. 31, 1914.
1,181,986.
Patented May 9, 1916.
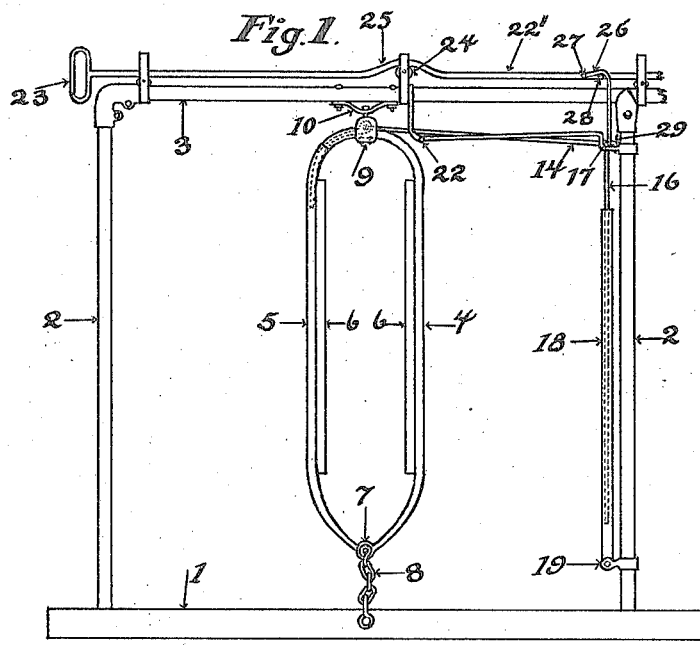
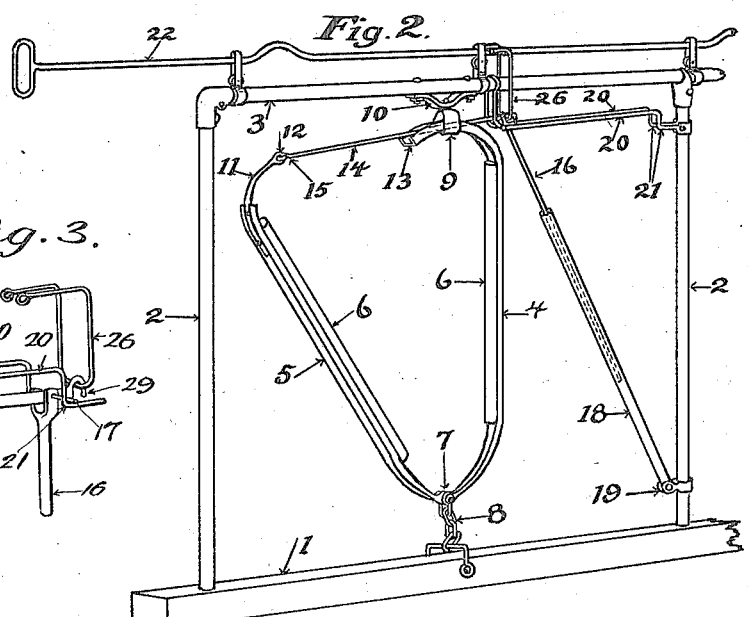

UNITED STATES PATENT OFFICE.

CONRAD BAETZ, OF TWO RIVERS, WISCONSIN.

STANCHION FOR ANIMALS.

1,181,986. Specification of Letters Patent. Patented May 9, 1916.

Application filed August 31, 1914. Serial No. 859,387.

*To all whom it may concern:*

Be it known that I, CONRAD BAETZ, a citizen of the United States, and resident of Two Rivers, State of Wisconsin, have invented certain new and useful Improvements in Stanchions for Animals; and I do hereby declare that the following is a full, clear, and exact description thereof.

The object of my invention is, to provide a stanchion which is simple in construction, which may be quickly and securely locked and unlocked, and which, while the animal's neck is within and is closed and locked, will oscillate or turn so that the animal may freely turn its head and lick its body. On the other hand, when the stanchion is open, it will not turn but will have a fixed position so that the animal's head and neck will always pass into the opened stanchion when it moves into the stall.

A further object of my invention is to provide an obstruction or sure stop so that the only open space which will admit the animal's head will be that of the opened stanchion, and to provide this obstruction or sure stop by the opening of the stanchion, and also to again eliminate the obstruction with the closing of the stanchion so that the animal will have sufficient space at each side of its neck so it can freely turn its head to lick its body.

Another object of my invention is to provide a lock for the stanchion which can be easily and quickly opened by a person, but which cannot be opened by the animal which is locked within the stanchion.

A still further object is to provide a means for simultaneously locking and unlocking, closing and opening any number of stanchions.

With the aforesaid objects in view, the invention consists in certain peculiarities of construction and combination of parts as hereinafter set forth with reference to the accompanying drawings, and thereafter claimed.

In the drawings: Figure 1. represents a view from either the front or rear of a series of stalls, (part only of the other stall is shown) with the stanchion closed and locked. Fig. 2. shows a perspective view of the same stalls as Fig. 1., except that the stanchion is shown open and unoccupied but ready to receive the animal. Fig. 3 shows a perspective view of detail of the connection of the sure-stop, locking bar, and link.

In the figures, 1, represents the sill which is on the floor of the stall; 2, are the stall partition posts; 3, is the stall bar; 4 and 5 are the stanchion arms; 6, is a wood lining; 7, is a hinge; 8, a short piece of chain which secures the lower end of the stanchion to the stall sill; 9, is a yoke firmly secured to the stanchion arm and connected by a bolt or rivet to the yoke, 10, which in turn is firmly secured to the stall bar. Yoke 9 and yoke 10 are not connected together firmly but are connected loosely so that the stanchion may turn and oscillate while it hangs.

11 in Fig. 2 represents the arm end which is firmly secured to the stanchion arm, 5, and is provided with an eye, 12. This arm end rests in the socket, 13, (Fig. 2,) when the stanchion is closed as shown by the dotted lines in Fig. 1, and it provides a strong and substantial stanchion equal to a solid ring around the animal's neck.

Numeral 14 is the locking bar which is provided with an eye, 15, connecting with the eye, 12, of the arm end, 11. To the opposite end of the locking bar, there is connected the "sure stop" bar, 16, by a pin 17. The sure stop bar is covered by the shield, 18, which is in turn connected to the stanchion post by movable joint, 19. This shield is for the purpose of preventing the sure stop bar from being lifted if the animal should rub its head at that point, as the sure stop bar slides in the shield, 18.

20, represents the two rails upon which the pin 17 rides as the stanchion is opened or closed. These rails are secured to the stall bar, 3, and stall post, 2.

The lock catch is represented by 21, behind which the pin 17 rests and locks the stanchion. Within the space between the rails 20 (Fig. 2) the sure stop bar moves as the stanchion is opened or closed.

22 is a bolt or stop between the rails against which the sure stop bar 16 rests when the stanchion is open.

To close and lock the opened stanchion, throw the shield, 18 to a vertical position shown in Fig. 1. when the pin 17 drops behind the lock catch. When the stanchion is closed (Fig. 1.), it can turn because of the oscillating joint, 12 and 15, so the animal can lick its body, but when the stanchion is open, the locking bar, 14, prevents the stanchion from swinging or turning so that the animal will place its neck between the stanchion arms.

One stall only is shown complete, but portions of the next one are shown. These stalls are usually placed in a row, side by side, and if it is desired, any number of stanchions may be opened or closed with my controlling device which operates as follows: The controlling rod, 22' opens and closes the stanchion. By pulling on the handle 23 (Fig. 1) which causes it to move on the roller 24, which is secured to the stanchion bar and by reason of the bend 25 the rod is lifted and it raises the locking bar 14 so that the pin 17 will be above the lock catch 21, and a continuation of the pull on handle 23 (Fig. 1) opens the stanchion and moves the sure stop in place. To accomplish this, the locking bar is connected with the control rod by link 26. As shown in Fig. 2, this link straddles the stall bar and is connected with the control rod by bolt 27. The link is loosely connected and is permitted to move up but the control rod is provided with a stop 28, so that when the rod is moved to close the stanchion the link has a firm position to push as it rests against the stop 28. The locking bar 14 is provided with a hook, 29, which is hooked into link 26. This hook is quickly disconnected from the link when it is desired to unlock or lock one animal at a time.

Having described my invention, I claim—

1. A stanchion for animals consisting of two parallel arms hinged together at one end and opening and closing at the opposite end, a pivotal joint for supporting the stanchion from a stall, said pivotal joint being secured to one of the stanchion arms, an oscillating joint in vertical alinement with and below said pivotal joint, said oscillating joint being secured to the opening end of the second arm of the stanchion, a stanchion locking bar connected with said oscillating joint, a lock catch, a rail, a sure stop connected to said locking bar by an oscillating joint, a control rod, a link connected to said control rod, a hook rigidly connected to the stanchion locking bar for engaging said link.

2. A stanchion for animals consisting of two parallel arms hinged together at one end and opening and closing at the opposite end, a pivotal joint for supporting the stanchion from a stall, said pivotal joint being secured to one of the stanchion arms, an oscillating joint in vertical alinement with and below said pivotal joint, said oscillating joint being secured to the opening end of the second arm of the stanchion, a socket on one arm of the stanchion, the opening arm of the stanchion being shaped to seat into said socket, a bar secured to said oscillating joint, locking means connecting with said bar.

3. A stanchion for animals consisting of two parallel arms hinged together at one end and opening and closing at the opposite end, a pivotal joint for supporting the stanchion from a stall, said pivotal joint being secured to one of the stanchion arms, an oscillating joint in vertical alinement with and below said pivotal joint, said oscillating joint being secured to the opening end of the second arm of the stanchion, a socket on one arm of the stanchion, the opening arm of the stanchion being shaped to seat into said socket, a locking bar connected with said oscillating joint, a lock catch, a sure stop connected to the locking bar by an oscillating joint.

4. A stanchion for animals consisting of two parallel arms hinged together at one end and opening and closing at the opposite end, a pivotal joint for supporting the stanchion from a stall, said pivotal joint being secured to one of the stanchion arms, an oscillating joint in vertical alinement with and below said pivotal joint, said oscillating joint being secured to the opening end of the second arm of the stanchion, a socket on one arm of the stanchion, the opening arm of the stanchion being shaped to seat into said socket, a locking bar connected with said oscillating joint, a lock catch, a sure stop connected to the locking bar by an oscillating joint, a control rod, a link connected to said control rod, a hook rigidly secured to the locking bar, said hook engaging with said link.

5. A stanchion for animals consisting of two parallel arms hinged together at one end and opening and closing at the opposite end, means at each end of the stanchion for securing the same to the stall, a locking bar connected to one of the stanchion arms by an oscillating joint, a socket on one arm of the stanchion; said other arm being shaped to seat into the socket, a catch for engaging said locking bar.

6. A stanchion for animals consisting of two parallel arms hinged together at their lower portions and opening and closing at the opposite end, a pivotal joint for supporting the stanchion from a stall, a yoke for connecting said pivotal joint to one of the stanchion arms, said yoke having two walls which are separated by an open space, a socket secured to the upper portion of one of the parallel arms, an arm end rigidly secured to the upper portion of the other parallel arm and projecting at an angle from said other parallel arm toward the center between the two parallel arms, said arm end resting within said socket when the stanchion is closed, means for pulling the opened stanchion arm to its closed position, said means being secured to said arm end by an oscillating joint and retained by the walls of the aforesaid yoke when the stanchion is open, locking means connecting with said first mentioned means.

In testimony that I claim the foregoing, I have hereunto set my hand at Two Rivers, State of Wisconsin, in the presence of two witnesses.

CONRAD BAETZ.

In presence of—
H. C. WILKE,
H. R. SCHWAKE.

Copies of this patent may be obtained for five cents each, by addressing the "Commissioner of Patents, Washington, D. C."